United States Patent
Kurian

(10) Patent No.: US 9,785,949 B2
(45) Date of Patent: Oct. 10, 2017

(54) CUSTOMER COMMUNICATION ANALYSIS TOOL

(71) Applicant: BANK OF AMERICA CORPORATION, Charlotte, NC (US)

(72) Inventor: Manu Jacob Kurian, St. Louis, MO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 420 days.

(21) Appl. No.: 14/287,869

(22) Filed: May 27, 2014

(65) Prior Publication Data

US 2015/0348048 A1 Dec. 3, 2015

(51) Int. Cl.
G06F 15/16 (2006.01)
G06Q 30/00 (2012.01)
G06F 9/54 (2006.01)

(52) U.S. Cl.
CPC .......... *G06Q 30/016* (2013.01); *G06F 9/546* (2013.01)

(58) Field of Classification Search
CPC ....................................... G06F 9/546
USPC ...................................... 709/206
See application file for complete search history.

(56) References Cited

U.S. PATENT DOCUMENTS

| | | | | |
|---|---|---|---|---|
| 7,127,400 B2* | 10/2006 | Koch | ..................... | H04M 3/527 379/211.02 |
| 8,032,383 B1 | 10/2011 | Bhardwaj et al. | | |
| 8,223,932 B2* | 7/2012 | Forbes | .............. | H04M 3/42025 379/90.01 |
| 8,538,801 B2* | 9/2013 | Giordano | ............... | G06Q 20/04 700/231 |
| 8,943,145 B1* | 1/2015 | Peters | ..................... | G06Q 50/01 709/206 |
| 2002/0152123 A1* | 10/2002 | Giordano | ............... | G06Q 20/04 705/14.33 |
| 2007/0055625 A1* | 3/2007 | Sheehan | ................ | G06Q 20/04 705/39 |
| 2007/0198267 A1 | 8/2007 | Jones et al. | | |
| 2008/0275701 A1* | 11/2008 | Wu | ................... | G06F 17/30017 704/235 |

(Continued)

OTHER PUBLICATIONS

Related U.S. Appl. No. 14/287,861, filed May 27, 2014.

*Primary Examiner* — Hamza Algibhah
(74) *Attorney, Agent, or Firm* — Michael A. Springs; Moore & Van Allen PLLC; Jeffrey R. Gray

(57) ABSTRACT

Embodiments of the present invention help users (e.g., associates, customers, or the like) utilize communications to take actions with respect to systems or applications that do not directly allow for users to take actions using the communications. In some embodiments the communications are voice communications (e.g., phone calls, voice activation, voice services through the Internet, or the like) or written communications (e.g., e-mail communications, text communications, or the like) or other like voice communications or written communications. The present invention identifies keywords in the communications to determine the application for which the user wants to take an action, and the action that the user wants to take. The present invention takes the action within the application based on the keywords, or requests additional information from the user through the communication channel (or another communication channel).

16 Claims, 4 Drawing Sheets

(56) References Cited

U.S. PATENT DOCUMENTS

| | | | |
|---|---|---|---|
| 2009/0003580 A1* | 1/2009 | Sharpe | H04M 1/006 379/211.02 |
| 2009/0216645 A1* | 8/2009 | Oleen | G06Q 30/02 705/14.1 |
| 2009/0232288 A1* | 9/2009 | Forbes | H04M 3/42025 379/93.23 |
| 2010/0217711 A1* | 8/2010 | Olson | G06Q 40/04 705/80 |
| 2011/0119287 A1* | 5/2011 | Chen | G06F 17/30448 707/768 |
| 2011/0153614 A1 | 6/2011 | Solomon | |
| 2012/0054289 A1* | 3/2012 | Aytulu | G06Q 10/107 709/206 |
| 2012/0278159 A1* | 11/2012 | Kumar | G06Q 30/0241 705/14.42 |
| 2013/0204784 A1 | 8/2013 | Ogden | |
| 2013/0297353 A1* | 11/2013 | Strange | G06Q 40/08 705/4 |
| 2015/0142642 A1* | 5/2015 | Suplee | G06Q 40/02 705/39 |
| 2015/0161644 A1* | 6/2015 | Bamane | G06Q 30/0226 705/14.27 |

\* cited by examiner

CUSTOMER COMMUNICATION ANALYSIS TOOL

FIELD

This invention relates generally to the field of using communications through traditional communication channels to take actions with respect to systems that are not connected to the communication channels. More particularly, embodiments of the invention relate to using voice and written communications to populate systems of record requests or to take actions on accounts through communication channels unrelated to the systems of record or accounts.

BACKGROUND

In order to fill out requests within systems of record, users have to log into various systems and applications and manually fill out requests on an as needed basis. Moreover, in order to make transactions with respect to accounts, users also typically have to log into various account management systems and applications in order to enter separate types of transactions across accounts. Taking these types of actions is often difficult, repetitive, and time consuming, especially when users try to take actions through mobile devices from remote locations with limited access to these systems and applications.

BRIEF SUMMARY

Embodiments of the present invention address the above needs and/or achieve other advantages by providing apparatuses (e.g., a system, computer program product, and/or other device) and methods that help users (e.g., associates, customers, or the like) utilize communications to take actions with respect to systems or applications that do not directly allow for actions to be taken using the communications. In some embodiments the communications are voice communications (e.g., phone calls, voice activation, voice services through the Internet using an application, or the like) or written communications (e.g., e-mail communications, text communications, an application through the Internet, or the like) or other like voice communications or written communications. The present invention identifies keywords in the communications to determine the application for which the user wants to take an action, and the action that the user wants to take. The present invention takes the action within the application based on the keywords, or requests additional information from the user through the communication channel (or another communication channel).

Embodiments of the invention comprise systems, computer program products, and methods for receiving customer communications from customers to take actions with respect to customer accounts. The present invention comprises receiving a request communication with a requested action from a customer to perform an action associated with a customer account. The present invention also comprises determining keywords within the request communication for the requested action. The present invention further comprises determining the keywords within the request communication for the customer account. The present invention also determines a profile for the customer associated with the request communication. The present invention further comprises determining if the customer has authorization to take the requested action in the customer account. Additionally, the present invention accesses the customer account and takes the action on the customer account based on the keywords within the request communication.

In further accord with an embodiment of the invention, the present invention determines if additional information is needed to take the action in the customer account. The present invention also sends a response communication to the customer, and the response communication comprises a request for the additional information needed to take the action in the customer account.

In another embodiment of the invention, the present invention receives an additional communication from the customer with the additional information needed to complete the action in the customer account. The present invention then determines the keywords within the additional communication from the associate, and completes the action in the customer account based on the keywords within the additional communication from the customer In yet another embodiment of the invention, the present invention submits the requested action to a business unit or regulator for approval to perform the action In still another embodiment of the invention, the present invention sends a summary communication to the customer requesting confirmation to take the action, and the summary communication includes details of the requested action. The present invention further receives a confirmation communication from the customer with the confirmation to take the action In further accord with an embodiment of the invention, the present invention comprises receiving additional communication from the customer to perform additional actions by cloning the action in the request communication In another embodiment of the invention, the present invention comprises assigning a request identifier to the requested action, and the request identifier is utilized to link related communications.

In yet another embodiment of the invention, the present invention comprises identifying an identity of the customer based on a customer identifier from the communication channel through which the customer sends the request communication. The present invention further comprises that determining if the customer has the authorization to take the requested action comprises comparing the customer identifier with the profile for the customer.

In still another embodiment of the invention, taking the requested action is further based on the profile of the customer.

In another embodiment of the invention, the communication channel is a voice call, an e-mail correspondence, or a text message.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
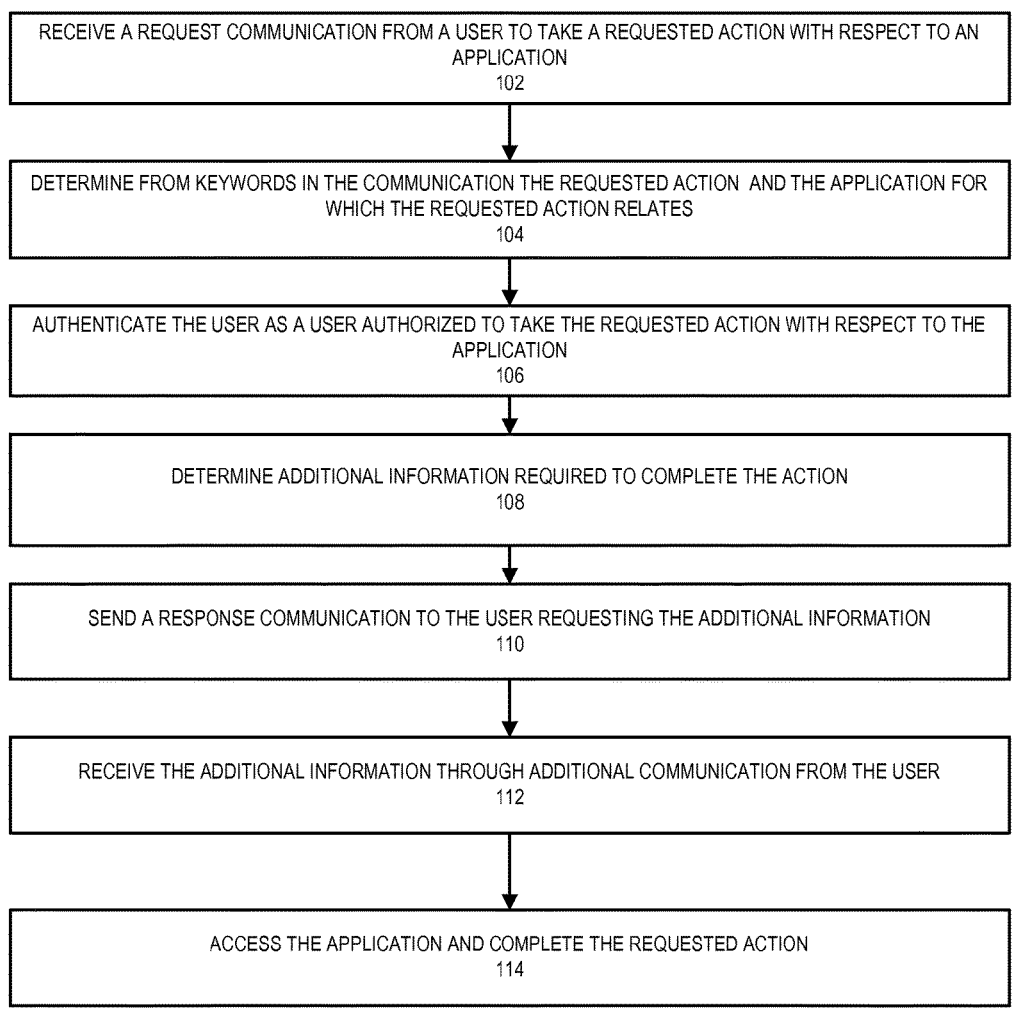
Figure 2:
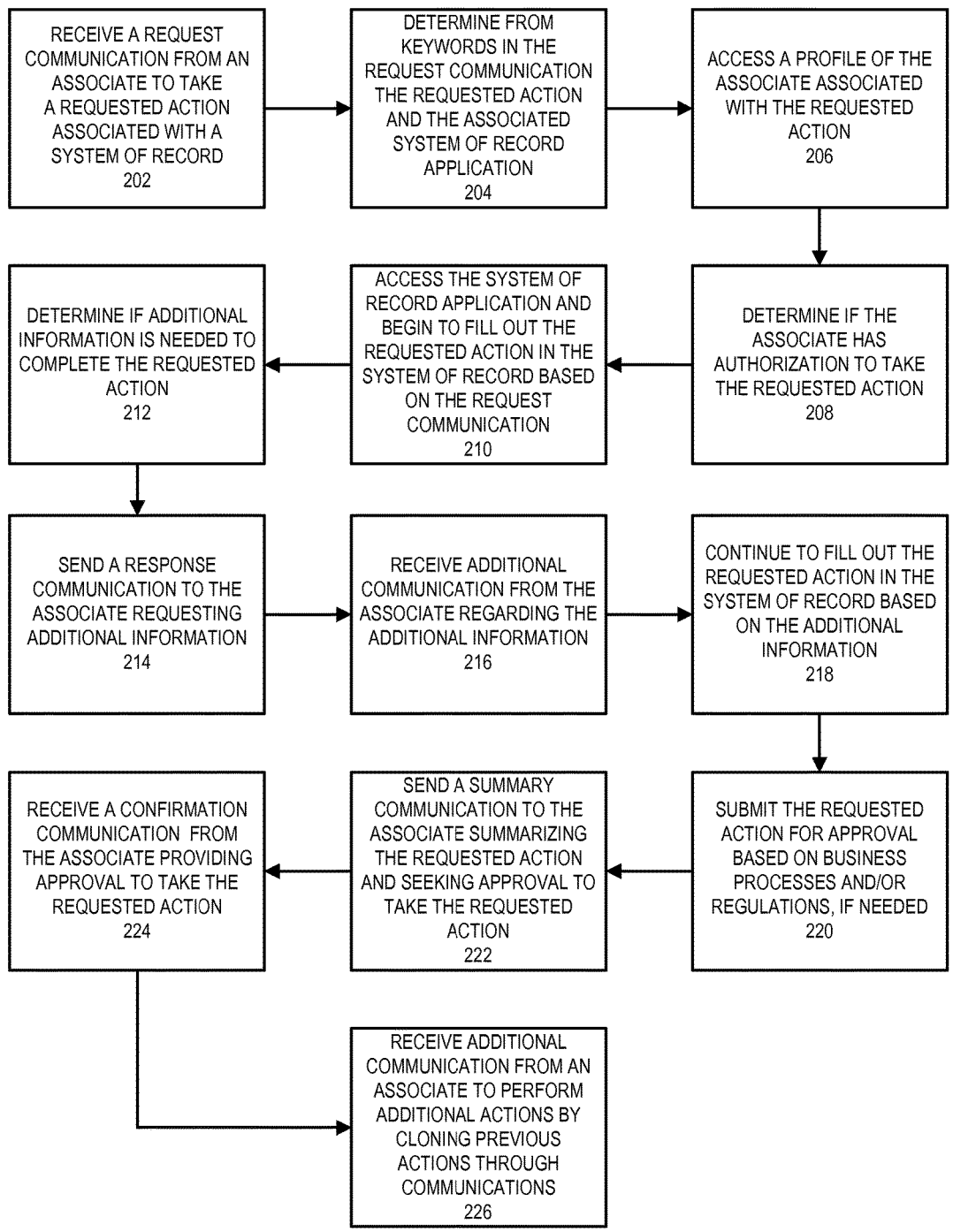
Figure 3:
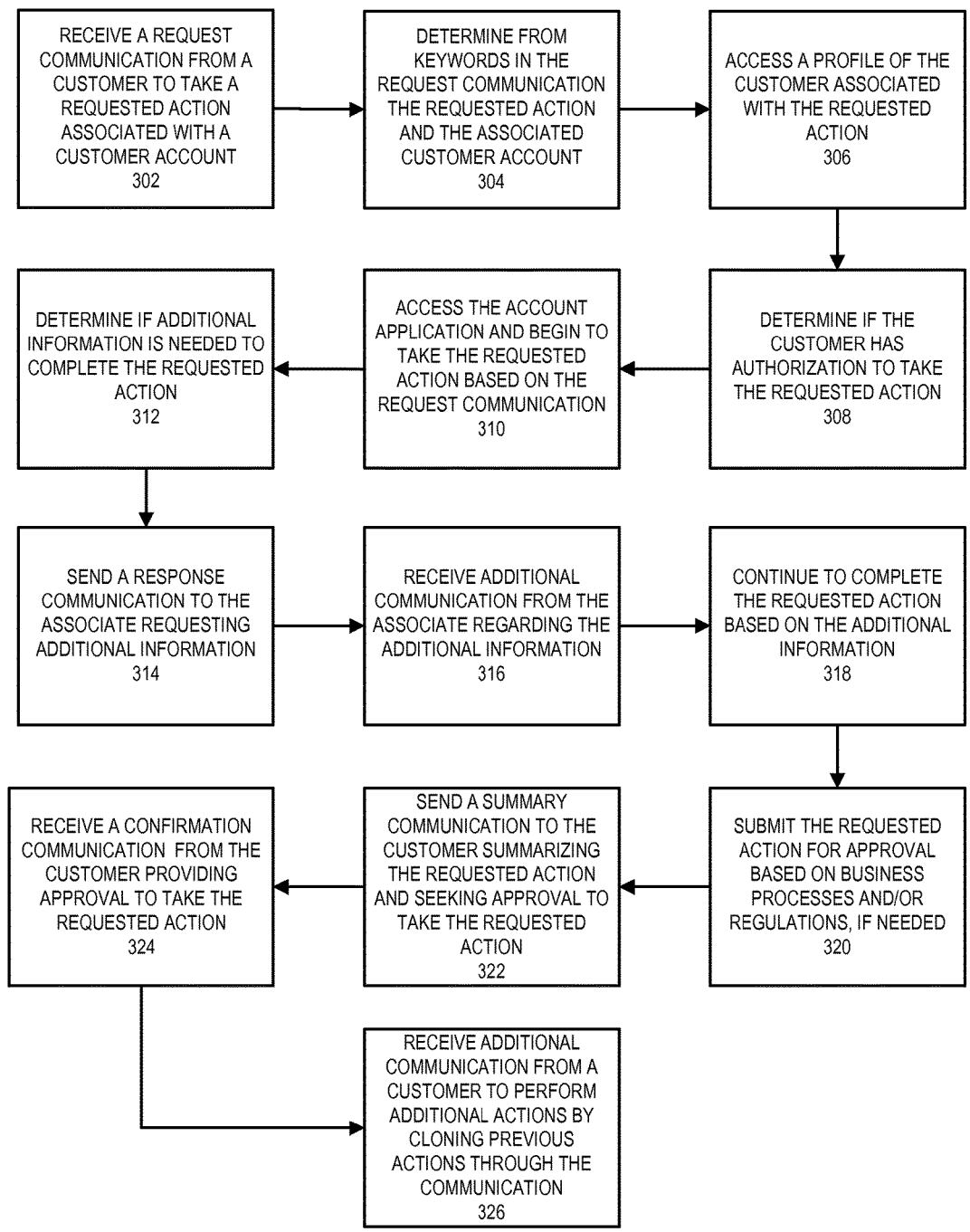
Figure 4:
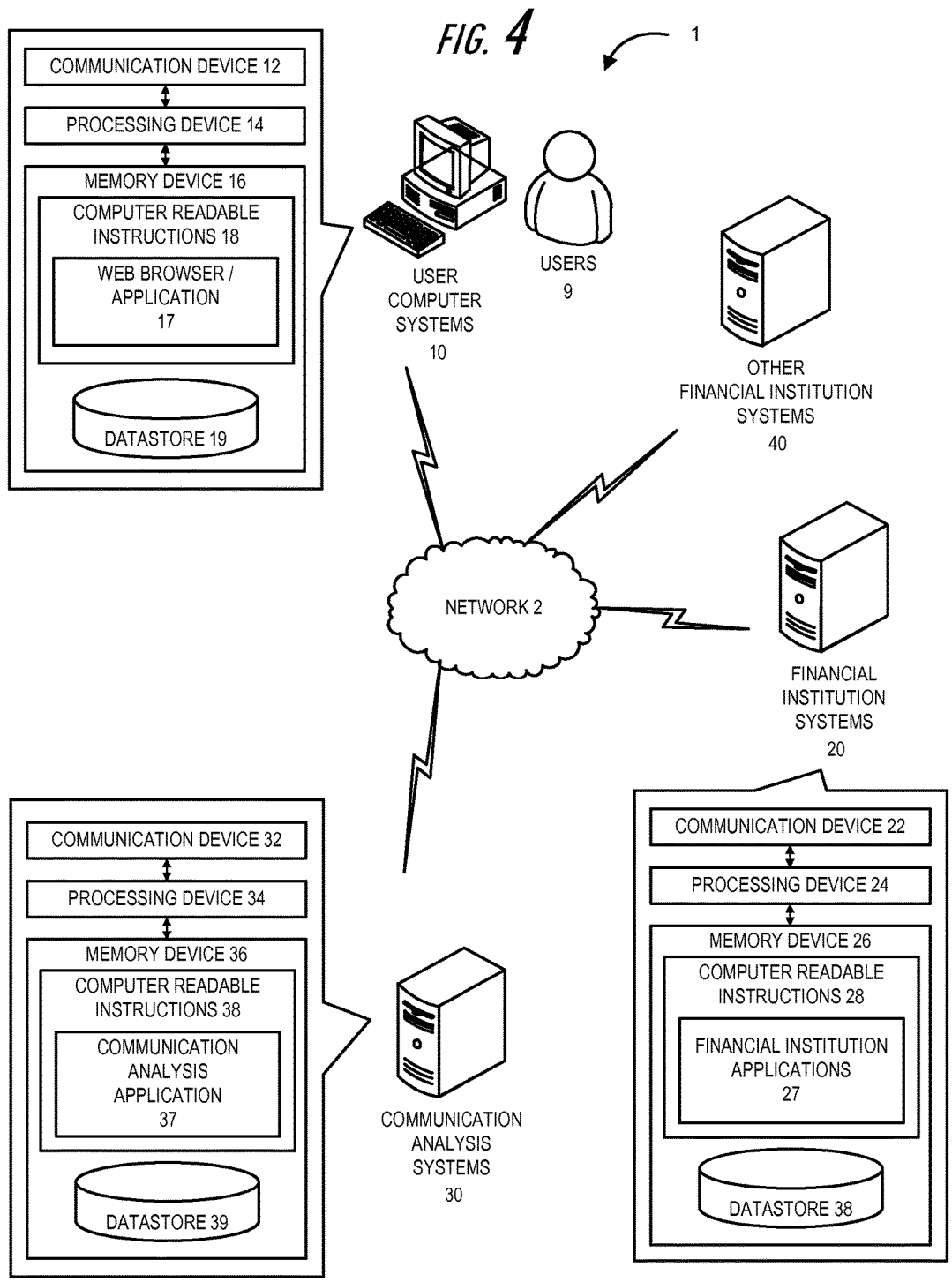

Having thus described embodiments of the invention in general terms, reference will now be made to the accompanying drawings, wherein:

FIG. 1 illustrates a high level process flow for a user taking actions with respect an application without directly communicating with the application, in accordance with one embodiment of the present invention;

FIG. 2 illustrates a process flow for an associate taking an action with respect to a system of record, in accordance with one embodiment of the present invention;

FIG. 3 illustrates a process flow for a customer taking an action with respect to a customer account, in accordance with one embodiment of the present invention; and FIG. 4 illustrates a block system diagram for a communication system environment, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution" or "bank," one of ordinary skill in the art will appreciate that other embodiments of the invention may involve other businesses or institutions that take the place of or work in conjunction with the financial institution or bank to perform one or more of the processes or steps described herein as being performed by a financial institution or bank. Still in other embodiments of the invention the financial institution or bank described herein may be replaced with other types of businesses or institutions that offer account services to users.

FIG. 1 illustrates a high-level process flow for taking actions with respect an application without directly communicating with the application. As illustrated by block 102 in FIG. 1 the communication system of the present invention receives a request communication from a user to take an action with respect to an application. As previously discussed the request communication may be a voice communication (e.g., phone call), in which the user makes statements regarding an action the user would like to take with respect to an application. Alternatively, the request communication may be a written communication (e.g., an e-mail, text message, or other like communication) in which the user sends a written communication electronically regarding an action the user would like to take with respect to the application. For example, the user may make the simple statement "take action 1 for application 1" in a voice communication or a written communication.

The user may send the request communication to a dedicated recipient (e.g., dedicated e-mail address, telephone number, communication drop box, dedicated application, or the like) that receives request communications from users and accesses the applications referenced in the request communications to take the requested actions in the request communications. The communication system of the present invention may be a centralized system that receives any type of communication from users and accesses any applications within the institution to perform the requested actions made by the users. In some embodiments the communication system (or application therein) may interface with the applications in the institution without the applications being programmed to interface with the communication system. However, in other embodiments the applications may be programmed to communicate with the communication system of the present invention (or application therein).

As illustrated by block 104 in FIG. 1, the communication system determines, from the keywords in the request communication, the requested action the user would like to take and the application for which the action applies. In continuing with the simple example from block 102, the system may identify "application 1" and determine that the user would like to take "action 1" with respect to "application 1" from the statement made in the communication.

Block 106 in FIG. 1 illustrates that the communication system determines the identity of the user making the request. The identity of the user may be determined through a user identifier (e.g. associate identifier, customer identifier, or the like) provided through the communication channel through which the user communicates. The user identifier may be the phone number through which the communication is received, an e-mail address from which the communication is received, a user name or other identifier in the signature block of the communication, an icon, images or avatar associated with the communication, a user name associated with an application from which the communication is received, or any type of string of characters, images, codes, or the like that identifies the user requesting the action and which is included within or along with the communication. The user identifier received by the system may be compared to a database that indicates the identity of the user within the institution controlling the communication system. In some embodiments, the user may have a user profile that provides user identifiers for various communication channels. As such, the user may register particular phone numbers, e-mail addresses, user names, images, passwords, or any other type of identifier in order to allow for authentication of the user. The user profile may also include additional authentication information that the user may register, in order to provide additional verification of the user taking actions through the communication channel. As such, the user profile may indicate keywords or other authentication means that must be included in or along with the communication in order to provide authentication of the user, or a second, third, or extra form of authentication. As such, in some embodiments the request communication may include a password and/or key fob identifier (e.g., numeric, alpha-numeric, or other character value) that is to be included in the communication in order to provide authentication of the user. For example, the user may enter a password and/or key fob identifier in the keypad of the phone, or simply speak the password and/or key fob identifier into the phone. In other examples, a particular word or characters may be required in the subject line of a written communication to provide a secondary means of authentication. Moreover, in other examples of written communications, the communication must be in a particular color, font, or font size in order to provide additional authentication. These user identifiers and/or other forms of authentication may be stored by the communication system, or another system or application, in a user profile. As such, in some examples described above the user may include the statement "keyword 1," "character set 1," "authentication 1," "password 1," or other like identifier somewhere in the communication (e.g., in the beginning, end, middle, or other location within the communication).

Once the identity of the user behind the communication is determined, the communication system may determine if the user has the approval to take the action with respect to the application. As such, once the user's identity is determined the system may access the application (or a database, system, or the like associated with the application) to determine if the user has the authority to take the action that the user is requesting. In one embodiment the profile of the user may include the login credentials of the user that would allow the communication system to sign into the application on behalf of the user. If the login was successful the user may have the approval to take actions within the application. Alternatively, the communication system may access a list associated with the application that includes the users that are allowed to take actions within the application, and/or a list of actions that particular users are allowed to take within the application. The communication system of the present invention may determine if the user associated with the requested action is allowed to take the requested action before submitting the requested action within the application. In other embodiments of the invention the communication system may take the requested action and submit the requested action for approval after submitting the requested action on behalf of the user, as will be discussed in further detail below. For example, returning to the simple example, the present invention may determine if the user is allowed to take "action 1" with respect to "application 1" by using user login information, a stored list of approved users and/or actions, or other like means.

As illustrated by block 108, the communication system of the present invention determines if additional information is required in order to complete the action. After the communication system access the application, the communication system may determine all of the information needed to complete the requested action. In other embodiments the communication system may submit what information the communication system has from the requested communication provided by the user, and receive further instructions or search for additional information from the application as to what additional information is required to complete the action. For example, the application may return required fields that need to be filled out (e.g., a list of additional fields, highlighted sections of the interface that need to be filled out, or the like), additional information that needs to be inputted or selected, terms that need to be agreed to, or the like. As such, returning to the simple example previously discussed, in some embodiments the present invention may access "application 1" and determine that in order to take "action 1" the application needs to know a name of a client, such as "client 1," to which to send information related to the requested action.

Block 110 of FIG. 1 illustrates that when additional information for the action is required, or when additional information is optional, the present invention may send a response communication to the user to request additional information for the action. In some embodiments the response communication may be through the same channel as the initial request communication from the user. For example, if the original request communication was a telephone call (or other voice communication), the response communication may be a phone call, while if the original request was an e-mail communication (or other written communication) the response communication may also be an e-mail communication. In other embodiments the response communication may be different than the original request communication. Moreover, in some embodiments, the response communication may indicate if the additional information is required or optional, and therefore, the user may or may not be required to provide additional information. As such, returning to the simple example previously discussed, the present invention may send an e-mail to the user stating "please provide the required information for the client's name" or another like statement, in order to request the name of the client for which the action should be taken.

As illustrated by block 112 in FIG. 1, the communication system of the present invention may receive an additional communication from the user including the additional information requested by the communication system for completing the request. As was the case with respect to block 110 the additional communication from the user may be through the same channel or through a different channel. If the additional communication from the user is through the same communication channel, or is a reply to the response communication from the communication channel, then no reference to the original request communication from the user may be required. However, in some embodiments, for example, when the additional communication from the user is through a different communication channel the additional communication may need to include a reference to the requested communication or response communication, such as a reference number or other like request identifier. In this way the communication system is able to identify the requested action for which the additional communication applies. Continuing with the simple example previously discussed, the user may provide additional communication with the name of the "client 1" for which the action applies. The present invention may associate the additional communication with the original request communication, for example because the additional communication is sent through an e-mail chain linked to the original request communication, through an identifier (e.g., "request number 1") in the voice communication or written communication, or other like means.

As illustrated by block 114 of FIG. 1, the communication system of the present invention may access the application associated with the requested communication and complete the requested action. Throughout the process described in FIG. 1, or after the required information has been collected from the user, the communication system of the present invention may access the application (e.g., from a user interface using login information of the user, from other login information, from backchannel interfaces with the application that users cannot access, or the like), populate the application with the information needed to complete the action, and submit the requested action for processing. For example, continuing with the simple example previously discussed, the requested "action 1" for sending information within "application 1" to "client 1" may be completed by the communication system of the present invention by populating an interface within "application 1" and sending the request.

As previously discussed, the user may utilize the communication channels and the communication system of the present invention in the event that the user is not able to access specific applications to initiate requests directly within the applications, may not have the time to effectively access the applications, may not have the Internet access to access the applications, may want to reduce the time it takes to fill out the interfaces associated with a request which may be performed more quickly using a communication channel instead of accessing the applications directly, or for other like reasons. For example, the user may be traveling, and thus, may not have time to log into the application to create the requested action. In other embodiments, the user may have limited access to the Internet, and thus, cannot access the application for the amount of time needed to fill out the interface. In other embodiments, the user may have to continuously fill out the same information on multiple occasions, which the user may be able to clone through the use of the communication system of the present invention. Moreover, in some embodiments of the invention the request within an application may only need to be partially populated (e.g., answer only some of the questions in the request), such that communication from the user need not include all of the information, but only the information needed to create the request or begin the request.

By utilizing communications directed to the centralized communication system instead of accessing the applications directly, the user may be able to send an electronic written communication, voice communication, or other like communication to request an action within the application without having to login to the application or populate multiple fields within the application. The application for which the requested action is desired may not be able to directly receive the communications from the user in order to take the requested action (e.g., cannot receive e-mail communications, does not have a voice system that interprets voice communications, or the like); however, the communication system of the present invention maybe able act as an intermediate application that facilitates taking the requested action within the desired application based on the keywords provided within the communication.

FIG. 1 above, as well as FIGS. 2 and 3 below, are discussed with respect to the communication system taking actions, but it should be understood that the actions may be taken by a communication application that is stored on devices or systems within the communication system, as will be discussed in further detail with respect to FIG. 4.

FIG. 2 illustrates one embodiment of utilizing the communication system discussed with respect to FIG. 1. FIG. 2 illustrates a process flow for an associate (e.g., employee, contractor, agent, manager, officer, or the like) of an institution (e.g., a financial institution) taking an action with respect to a system of record. A system of record may include systems that send information to others, systems that transact with other systems within an institution, systems for requesting services within an institution, systems that store information for products (e.g., goods or services) of the institution, systems that monitor other systems, systems that collect data, and/or any other type of system within an institution in which an associate has to populate data to take an action or to capture an action taken. The communication system of the present invention allows for the automatic population of request interfaces in these systems of record for which associates usually have to manually populate to initiate requests (e.g., create records, request services, or the like) within the systems of record of the institution. The communication system is particularly useful when the associate has limited access to the Internet, has limited time to initiate a request, is working from a device with limited capabilities (e.g., small screens, no keyboard, or the like), has to create multiple requests that are similar, or is otherwise unable to access a system of record to request an action.

In some embodiments of the invention, an associate within an institution may be required to fill out website interfaces, application interfaces, or other like interfaces in order to take actions that fall under the scope of employment of the associate. For example, one system of record may include a system which requires a user to fill out an interface to send data to another entity (e.g., other associate within or outside of the institution, another business unit within the institution, a client of the institution, a vendor for the institution, or the like). In order to send data to the entity the associate may be required to follow institutional or governmental processes to protect the data being sent, capture a record of the data being sent, report the information being sent to other institutions, or the like. As such, the associate may have to fill out a request interface within a system of record in order to send the data and capture a report that the data has been sent. The request interface may require the associate to populate the interface (e.g., answer questions, fill in information, attach data, or the like) with information about the entity, entity location, type of data being sent, user approval to allow the request, description of the information being sent, attach the information, or the like. In some embodiments it may be necessary to fill out some of the data to begin the request, and additional information may be populated at a later point in time. Moreover, some of the information within the interface may be required, while some of the information may be optional. The present invention allows an associate to initiate a request within a system of record more efficiently than trying to log into the systems of record and fill out the interface through a smartphone, computer, or other device when the user has limited Internet access, has limited time to create the request, is unable to access the system of record, or the like. As such, if an associate wishes to create a request when access to the systems of record may be difficult, such as when access to an interface, file transfer protocol (e.g., FTPs), host database system (HDBS), websites, or the like may be difficult, the communication system of the present invention allows for an associate to request actions through the use of general communication channels that are not specifically related to these systems of record. The communication system of the present invention allows for the receipt, parsing, identification, and sending of the request for the systems of record.

As illustrated by block 202 in FIG. 2, the communication system receives a request communication from an associate to perform an action associated with a system of record within an institution. For example, the associate may type out a written e-mail communication that states "send data 1 to entity 1 through system of record 1," or otherwise make this statement in a voice communication. The statement does not need to be a uniform statement. As such, any associate (or other user described herein) may make any type of statement to take the requested action as long as it includes the keywords that are needed to identify the action and associated application. In another example, an associate may use the statement "use system of record 2 to send entity 1 the data 1 information." As long as the keywords are included in the written or voice communication, the request communication may be used to populate the request interface in the system of record.

Block 204 of FIG. 2 illustrates that the communication system determines from the keywords in the request communication, the requested action and the system of record for which the requested action is associated. With respect to a written communication, the communication system of the present invention scans the written correspondence to determine the keywords included in the request communication. With respect to a voice communication, the communication system of the present invention identifies the words stated in the voice communication using software that transforms the spoken words into text or other electronic data. The words that are included in the communications may be matched against applications and/or actions stored within the communication system, other systems, or applications within the institution (e.g., financial institution). For example, a database may store keywords identified in the communications that may be associated with particular applications or actions that could be used by associates (or other users described herein). In some embodiments, the keywords for applications, actions, clients, or the like may include the full names, abbreviations, identifiers, code names, or the like for each. In one embodiment keywords may also be used within the communications to improve security when requesting actions through the various communication channels. The keywords may change over time to further improve security over time. As such, in the example provided above with respect to FIG. 2, the communication system scans the e-mail and determines that the requested action is "send data 1 to entity 1" and the system of record is "system of record 1."

As illustrated by block 206 in FIG. 2, the communication system determines a profile of the associate associated with the requested action. In some embodiments, in order to fill out particular data within the request interface of an application, the communication system determines the identity of the associate that is making the request. The identity of the associate can be determined in a number of ways as previously discussed; however, in one embodiment the identity may be determined by accessing the profile of the associate within the institution (e.g., within the communication system, or another institution system). Depending on how the associate made the request communication, the request communication may include information related to the identity of the associate, and as such, the communication system may be able to cross-reference the associate information from the request communication with stored profile information. For example, if the request communication was a written communication, the communication system may have the e-mail address, the telephone number (e.g., communication through a text message), a name of the associate, associate employee identification number (e.g., ID), or the like. The communication system may access a profile of the associate from a profile database. The profile may be used to populate additional information in the request interface and/or to authorize the associate as someone with the authority to initiate the request, or otherwise make the request. For example, continuing with the example discussed with respect to FIG. 2, the request interface may require that the associate fill out not only the data to send (e.g., "data 1") and the entity to send the data to (e.g., "entity 1"), but may also have fields for the associate's name, associate's title, associate's contact information, the associates manager that requires approval, the associate's login information, the associate's contacts at the entity, or any other type of information that may be required or optional in order to initiate the requested action. In some embodiments, the additional information from the associate profile may be populated into the request interface after the communication system determines the identity of the associate and accesses the associate's profile.

In some embodiments of the invention, the associate's profile may also include information that may be automatically populated as previously saved by the associate within the associate's profile. For example, the associate may indicate in the profile that for "data 1" the data may always be found in a particular database, the amount of the data to send (e.g., data captured over the last month), or additional information that is always sent along with "data1" (e.g., additional paperwork). In some embodiments, the additional information may be provided by the associate in the request communication, or otherwise may be stored in the user's profile and updated automatically whenever the associate makes a request involving "data 1."

Block 208 in FIG. 2 illustrates the communication system determines if the user has authorization to take the action with respect to the systems of record. The systems of record may require login information related to any request made by an associate, and as such the communication system may log into the systems of record using the associate login information or other login information (e.g., a dedicated login for the communication system). In other embodiments, the systems of record may have databases that store what associates are allowed to take what actions. For example, some associates may be allowed to populate the request interface, but not have the ability to submit the request until the request is approved. Other associates are allowed to populate the request interface and submit the requested action. As such, the associate's identity is determined by the communication system, and the associate's authorization to take an action may be determined through the use of login information within the application, a database that stores the associates that have access to and the ability to take actions within the system of record, or other authentication means.

After the associate is authorized, as illustrated by block 210 in FIG. 2, the communication system of the present invention accesses the system of record and begins to fill out the request in the system of record based on the request communication from the associate. The communication system of the present invention fills out the request interface in the system of record based on the keywords from the request communication received from the associate and any additional information included in the profile of the associate. As such, in the example described herein the communication system accesses the "system of record 1," captures the "data 1" from the location where the data is stored, attaches "data 1" to the request interface, populates the request interface with "entity 1" and any associate information from the associate profile.

Block 212 in FIG. 2 illustrates that the communication system of the present invention determines if additional information is needed to complete the action for the request communication. As previously discussed this may occur by the communication system identifying additional fields in the request interface of the system of record, by receiving a request from the system of record to provide additional information, or the like. Continuing with the previous example, the keyword included in the request communication for sending the data to "entity 1" may relate to two different entities (e.g., entity 1a and entity 1b), and as such the communication system of the present invention may determine that additional information is needed in order to identify the proper entity to which to send the data. Moreover, the requested action may require that the data is sent to a specific recipient within the entity, and as such, the communication system of the present invention identifies that additional information is required to complete the request.

As illustrated by block 214 in FIG. 2, the communication system sends a response communication to the associate requesting the additional information needed to complete the request within the system of record. In some embodiments, the communication system of the present invention may include in the response communication a question regarding whether the associate wanted to take a first, second, third, or other like action, or otherwise request additional information from the associate. For example, continuing with the example provided above the response communication may include a request for the associate to specify a particular entity (e.g., entity 1a or entity 1b) and include a name (e.g., name 1) of a person to which the data should be sent. It should be understood that the response communication may be for any type of information needed to complete the request. Moreover, it should be understood that the response communication may occur through any type of communication channel, but in some embodiments it will mirror the original communication channel used for the request communication from the associate. For example, if the original communication was an e-mail the response communication may be a response e-mail that includes the details of the original e-mail sent by the associate. Alternatively, if the original request communication was a text message or voice communication, the response communication may be a text message or voice communication (e.g., automated response). The response communication may simply request the associate to respond to the response communication with an additional communication that includes the keywords requested by the communication system. For example, the associate may only need to respond to a response communication e-mail by replying and included the keywords for the answers related to the additional information (e.g., entity 1a and name 1) requested by the communication system. However, in some embodiments the response communication may include a particular location within the response communication in which the response should be included (e.g., pre-identified location in a written communication, or an answer order within a voice communication, in which the associate includes the additional information and returns the response communication through the same communication channel). In other embodiments, the response communication may also include a request identifier or the original request communication, such that the associate knows to what request the response communication is related.

Block 216 in FIG. 2 illustrates that the communication system receives the additional communication from the associate regarding the additional information needed to complete the requested action. As previously discussed with respect to block 202 the additional communication may include written communications or voice communications that can be utilized to respond to the communication system's response communication. Continuing with the example, the additional communication may include the full entity name (e.g., entity 1a) and/or the name of the contact to which the data should be sent.

As illustrated by block 218 in FIG. 2 the communication system of the present invention continues to fill out the request interface in the system of record based on the additional information received from the associate. The communication system of the present invention identifies keywords in the additional communication received from the associate and determines if the additional communication is what was needed to complete filling out the request interface in the system of record. The communication system of the present invention can populate a system of record if all the information has been gathered or send more response communications to gather additional information from the associate.

Block 220 in FIG. 2 illustrates that the communication system of the present invention submits the requested action for approval based on institution processes (e.g., business processes) or government regulations, if needed. In some embodiments, before the requested action may be completed the communication system of the present invention may submit the request in the system of record to other associates (e.g., managers, or the like) that are required to approve the requested action before the action is taken. In some embodiments the system of the present invention may send the requested action for approval, or this feature may be built into the system of record itself.

As illustrated by block 222 in FIG. 2, in some embodiments the communication system of the present invention sends a summary request communication back to the associate for confirmation of the requested action. The summary request communication may include details regarding the request for the system of record. For example, the summary request may include headers and entries for the fields filled out by the communication system of the present invention. In continuing with the example discussed with respect to FIG. 2, the summary request communication may include the type of data (e.g., "data 1"), the entity (e.g., "entity 1a") to which the data is being sent, the system of record (e.g., "system of record 1"), the date and time the data will be sent, the contact at the entity, information about the associate sending the request action, or the like may all be included in the summary request communication that is sent to the associate. The summary request communication is sent to the associate for confirmation of the requested action before the requested action is taken. In some embodiments the summary request communication may comprise text that is included in a written communication, a screen shot of the request interface filled out with the information, a voice recording of the details of the request that the associate can access by calling or accepting a call, or another like communication channel. In one embodiment the summary request communication may include a link that allows the user to quickly access a summary of the requested action, such as a link provided through e-mail, text message, or another written communication channel. In some embodiments of the invention the summary request communication may include a request action identifier (e.g., number, letters, or characters) to identify the requested action for future reference or for cloning additional requests, as described below. In other embodiments the invention request action identifier may be sent to the associate when the initial request is made by the associate (e.g., after the request communication is received) or after the request has been completed (e.g., in a final communication from the communication system verifying that the action has been taken, which may also include some of the same information as the summary request communication).

Block 224 in FIG. 2 illustrates that the communication system of the present invention receives a confirmation communication from the associate in response to the summary request communication, confirming the approval to take the action. As such, in the present example the associate may send an approval to take the requested action after reviewing the summary request communication.

As illustrated by block 226 the present invention may receive other communications from the user to perform additional actions within the system of record, such as but not limited cloning any previous actions. For example, the associate may use phrases like "copy request action 1, but send to entity 2" As such, in the present invention the associate may create multiple redundant or similar requested actions without having to fill out each of the request interfaces separately. In still other embodiments the associate may use phrases such as "copy request action 1, but send to entity 2, entity 3, entity 4, entity 5, and entity 6." As such, the associate may create additional multiple requested actions without having to fill out a request interface for each of the actions. The associate may use requested actions that were already taken in the past using another means (e.g., the associate or another associate filling out the request interface directly during a time period before the associate uses the communication system of the present invention), by using request identifiers previously assigned to other requested actions previously completed.

FIG. 3 illustrates one embodiment of utilizing the communication system discussed with respect to FIG. 1. FIG. 3 illustrates a process flow for a customer (e.g., individual, employee of a business, contractor of a business, agent of a business, manager of a business, officer of a business, or the like, which are customers of the financial institution or third-party institution) taking an action with respect to one or more customer accounts (e.g., a checking, savings, credit card, debit card, payment, investment, retirement, education, healthcare, or any other type of customer account). In some embodiments a customer of an institution may be required to login to various accounts and/or fill out website interfaces, application interfaces, or other like interfaces in order to take actions with respect to the accounts of the customer. As previously discussed it is much faster for a customer to send a simple request communication over a traditional communication channel in order to take an action with respect to the customer accounts without having to log into applications associated with the customer accounts and fill out the one or more interfaces within the applications to take actions for the customer accounts. In some embodiments, the requested actions may be, but are not limited to, transferring money between accounts, paying a bill using an account, adding a company to a bill pay list, purchasing or selling a stock using an account, cashing in account reward benefits, transferring money to another customer, entering into a transaction using an account, or the like. In some embodiments a customer may want to take multiple actions over a number of accounts that are related customer accounts. In these cases the customer typically has to login to multiple applications, or access multiple sections within an application, in order to take multiple actions across multiple customer accounts. One example of a requested action may be transferring "X" dollars from a savings account to an investment account to purchase "Y" shares of "stock 1." Traditionally, in order to make this type of transaction, the customer would have to log into the customer's online banking system to enter the savings account section (or money transfer section), indicate an amount to transfer, indicate the investment account to which the amount is being transferred. Then the customer would login to the investment account (or otherwise access the investment account through the online banking account application) identify the stock, indicate the quantity of stock, identify the type of stock purchase (e.g., market price, limit price, or the like), and enter into the stock purchase transaction. This process may take multiple steps through multiple websites or application interfaces in order to enter into the desired transactions. In the present invention, as explained in further detail below the customer needs only to make a simple statement within a communication through a traditional communication channel to take the same action as was described above. As such, the present invention allows a customer to initiate an action with respect to a customer account more efficiently than trying to login to the various accounts and take the actions through a smartphone, computer, or other device when the user has limited Internet access, has limited time to create the request, or otherwise is unable to access the customer accounts or applications for the customer accounts. In some embodiments, the customer may be traveling, and thus, may not have time to login to the accounts to take the action. In other embodiments, the customer may have limited access to the Internet, and thus, cannot access the account applications for the amount of time needed to take the actions (e.g., enter the various transactions in the various accounts). In other embodiments, the user may have to make similar transactions on multiple occasions, which may be able to be cloned using the present invention.

The system of the present application may allow for the customer (or other user) to access a single website, application, or utilize traditional communication channels (e.g., e-mail, text message, phone calls, voice commands, or the like) to take one or more actions (e.g., transactions) for one or more customer accounts without having to login to the various accounts or create the separate actions (e.g., transactions). Some customers may not want to, or may not have the ability (e.g., access, time, or the like) to login to a number of different account systems or applications, and take a number of different actions within the account systems or applications. As such, the communication system of the present invention allows a customer to send a single communication to take a number of actions across multiple accounts, for example to transfer money, purchases stocks, sell stocks, transfer trust account funds, or perform additional transactions.

As illustrated by block 302 in FIG. 3, the communication system of the present invention receives a request communication from a customer to take a requested action associated with a customer account. As previously discussed with respect to block 102 and 202 the request may be in the form of written communications, voice communications, or other like communications. For example, a customer may want to transfer an amount of money from a first account to a second account. In order to transfer money from one account to another account, a customer typically has to access a website, application, or another system and provide login details and authentication to login to access the account. Then the user has to access the first account section (or transfer section) and transfer money to the second account. The communication system of the present invention allows the customer to complete this action without having to access the specific account or account application (e.g., online banking account application). In another amendment, a customer may want to indicate that he/she is leaving the country and may want to put an alert on the customer's account (e.g., credit card account) to allow transactions in one or more specific foreign countries or regions during a specific time period. For example, the customer may only have time to send a quick communication instead of logging into an application and finding a section of the application for international travel (e.g., the customer is on a flight, has limited access to the Internet in the foreign country, or the like). In some embodiments, it may be difficult for a customer to find sections within an application that allow a customer to take a specific type of action within the application (e.g., send a notification that the customer will be out of the country). As such, the communication system of the present invention allows the customer to send a communication to indicate that he/she is traveling to one or more countries, will be gone for "X" days, wants to limit purchases to less than "Y" amount for "X" days, or the like. The communication system of the present invention allows the customer to take the action of notifying the institution without the customer having to log into a specific account, application, system, or the like run by the institution. The communication system of the present invention that receives the request, identifies the action, and sends the requested action to a transaction processing department, to an account misappropriation department, or to other departments in order to complete the requested action.

In some embodiments of the invention, with respect to making transfers between accounts using the written or voice communications, the transactions may only be limited to transactions between accounts owned by the customer. This may increase the security of the communication system by preventing some actions from occurring when the actions result in money leaving the customer's accounts and transferring this money to accounts outside of the institution. Moreover, the customer may be required to link any customer accounts to each other before using the communication system in order to make transfers between the customer accounts using the communication system. In other embodiments of the invention the accounts do not need to be previously linked, but the communication system of the present invention, or the other systems within the financial institution, may by be able to determine that the customer is the owner of both accounts.

Block 304 illustrates that the communication system of the present invention determines from keywords in the request communication, the requested action and the associated customer account, or multiple customer accounts, for which the customer wants to take the requested action. In one example, the customer may state in a written communication or a voice communication to "transfer X dollars from account 1 to account 2 and purchase Y shares of stock 1." In other examples, the customer may be able to recite "traveling to country 1 and country 2 for X days." It should be understood, that the customer may be able to make any statements with respect to the customer's accounts in order to take actions within or across the customer's accounts.

As illustrated by block 306, embodiments of the communication system of the present invention include accessing a profile of the customer associated with the requested action. As previously discussed with respect to the associate in block 206 in FIG. 2, the communication system of the present invention may access a profile of the customer in order to determine additional information related to the customer. In some embodiments, in order to take actions with respect to the customer accounts the system verifies the identity of the customer that is making the requested action for the customer accounts. The identity of the customer, as was the case with the associate described with respect to FIG. 2, can be determined in a number of ways, as previously discussed. In one embodiment the identity of the customer may be determined based on a customer identifier, which may be dependent on how the customer made the request communication. For example, if the request communication was a written communication, the system may have the e-mail address, the telephone number (e.g., communication through a text message), a name of the customer, customer identification number (e.g., ID), or the like. The communication system identifies the customer based on the customer identifier received along with the communication, and the communication system may cross-reference the customer identifier with the profiles stored by the institution. The communication system may access a profile of the customer from a profile database to determine the identity of the customer using the customer identifier. The requested action may also require the customer's name, customer's title, customer's contact information, any approval required for the action (e.g., manager approval from transactions taken by customer when the customer is an employee of a business, or the like), the customer's login information, or any other type of information that may be required or may be optional in order to initiate the requested action, which may also be stored in the profile. In addition to identifying the customer, the customer profile may also be used to provide secondary authorization information for the customer in order to take the requested action, as well as to identify additional customer information for use in populating additional information for the request, as previously discussed with respect to the associate.

Block 308 of FIG. 3 illustrates that embodiments of the communication system of the present invention include determining if the user has authorization to take the requested action with respect to the customer account. In some embodiments of the invention, the application, through which the customer account may be accessed, may require login information for any request taken by an associate. In other embodiments, the customer account may be associated with a database that lists the profiles of customers that have approval to take different actions with the account. The communication system determines the customer's identity and if the customer is authorized through the use of login information, the database that stores the customers associates that have access, or other authentication means.

In some embodiments, as previously discussed with respect to block 106 and 208, the customer may register particular phone numbers, e-mail addresses, or the like in order to provide authentication of the customer. The customer profile may include additional authentication information that the customer may register. As such, the customer profile may indicate words, characters, phrases, the order of each of these, or the like that must be included in the communication in order to provide authentication of the user, or a second, third, or extra form of authentication. In other embodiments, the communication may include a password and/or key fob identifier (e.g., numeric, alphanumeric, or other character value) that is to be included in the request communication in order to provide authentication of the user. As such, the communication system of the present invention may be able to access an application to proceed with a requested action using authentication that is the same as, different than, or incorporates both a customer's traditional login information (e.g., user name and password) for the application and additional back-up authentication. However, it should be understood that the customer is not actually logging into the application, instead the communication system of the present invention is using various authentication means (e.g., traditional login information and/or information included in the request communication) to complete requests received from the customer without the customer ever having to access the application and/or login to the application. For example, the customer profile may indicate that the requested transaction is only authorized when the communication request is sent from a particular phone number and includes a randomized keyfob authentication number, a keyword in the subject line of the communication (e.g., e-mail, or voice recording) or another like authentication means in the request communication.

Block 310 of FIG. 3 illustrates that embodiments of the communication system of the present invention comprise accessing the customer account, for example through an account application (e.g., an online banking account), and taking the requested action based on the request communication. To continue with the previous example, the communication system of the present invention may communicate with the application for "account 1" and transfer "X dollars" to "account 2." The communication system may be able to communicate with the account application and take this action on the back end of the institution systems; however, in other embodiments of the invention the communication system uses the login information stored for customer (e.g., in the profile of the customer or other database) to log into "account 1" and to make the transfer. Thereafter, the communication system of the present invention may access the account application for "account 2" to purchase "Y shares" of stock 1." If the communication system of the present invention does not have all of the information to complete the stock purchase, or other action, the communication system may request additional information from the customer. In the other example described in FIG. 3, the communication system accesses a system or application for a transaction department or misappropriation department (e.g., through an account application interface, or other interface) to indicate that the customer is "traveling to country 1 and country 2 for X days."

As illustrated by block 312 in FIG. 3, embodiments of the communication system of the present invention include determining if additional information is needed to complete the action. Continuing with one of the examples, the communication system of the present invention may determine that in order to make the transaction to purchase "stock 1" in "account 2" the communication system needs to know if the stock order is a market order, limit order, or the like. In the other example, additional information related to the days on which the customer is traveling in "country 1" and "country 2" may be needed for an application for the transaction department or the misappropriation department to complete the action.

Block 314 in FIG. 3 illustrates that embodiments of the present invention include sending a response communication to the associate requesting additional information. For example, the system of the present invention may send a response request in the form of an e-mail (or another written communication, a voice communication, or the like) prompting the customer to indicate whether the stock purchase is a market order, limit order, or stop buy order. In the other example, the institution may send a response communication prompting the customer to indicate how long, and the dates, for which the customer will be located in "country 1" and "country 2."

As illustrated by block 316 in FIG. 3, embodiments of the communication system of the present invention include receiving additional communication from the associate regarding the additional information for the requested action and determining if the additional information satisfies the information needed to complete the request. For example, the customer may respond with an e-mail (or other written, voice communication, or the like) that states that the stock purchase is a market order. In the other example, the customer may send an e-mail (or use another written or voice communication) to recite that the customer will be in "country 1" from "date 1" to "date 2" and "country 2" from "date 2" to "date 3."

Block 318 in FIG. 3 illustrates embodiments of the communication system of the present invention include continuing to complete the requested action based on the additional information received from the customer. Continuing with one of the examples, the communication system of the present invention may login to the application for "account 2," or otherwise access the systems that control "account 2" and make the request to purchase "Y shares" of "stock 1" through a "market order." In the other example, the system of the present invention accesses the systems or applications that control the acceptance or denial of transactions, and associates the countries and dates in which the customer will be traveling in order to allow transactions for the customer account in these countries during the indicated time periods, but not during times that are outside of the time periods or in other countries during the time periods.

As illustrated by block 320 in FIG. 3, embodiments of the communication system of the present invention include submitting a request for approval, for example based on business processes, government requirements, or the like. For example, entering a transaction that requires approval for a stock purchase on margin may require business unit or SEC approval, or the like. As such, the communication system of the present invention will request approval from the desired entity (e.g., business unit within the institution, outside of the institution, or the like). This approval may be requested and agreed to, or denied, through the communication system of the present invention, or in other embodiments, through the processes within the applications that control the transactions. Continuing with the examples discussed herein, the communication system of the present invention may request and/or receive approval from the business group in charge of monitoring stock purchases, if necessary, in order to make the stock purchase in the application for "account 2." Moreover, in the other example, the communication system of the present invention may request and/or receive approval for utilizing the customer account in "country 1" and/or "country 2."

Block 322 in FIG. 3 illustrates that embodiments of the communication system of the present invention sends a summary communication to the customer requesting confirmation to take the requested action. As previously discussed with respect to block 222 in FIG. 4, the summary request communication may include the details of the action to be taken. As such, the customer may be able to review a summary of the requested action before the communication system of the present invention takes the action. For example, the summary communication may provide details of the transfer from "account 1" to "account 2" the amount of the transfer, "stock 1" being purchased, the "market order" and any other information associated with the actions or groups of actions. With respect to the second example, the summary communication may provide details of the countries and time periods for which the customer will be located in the countries.

As illustrated in block 324 in FIG. 3, embodiments of the communication system of the present invention include receiving a confirmation communication from the customer regarding the requested action. For example, the customer may indicate that the summary communication is correct and to proceed with the requested action. The confirmation communication may be in the form of the written or voice communication previously described herein.

Block 326 in FIG. 3 illustrates that embodiments of the communication system of the present invention include receiving additional information from the customer to perform additional actions by cloning previous actions through additional communications, as previously discussed with respect to block 226. Returning to one of the previous examples, the action of transferring money may be associated with a request identifier, which the customer may use to clone additional transactions in the future. For example, the user may recite "perform request identifier 1" for "stock 2", "stock 3", "stock 4", "stock 5", etc. In this way the customer can easily take actions for a number of transactions without having to continuously login to or fill out the information within various interfaces for account applications.

In other embodiments of the invention, throughout the process the customer may edit or change the requested action by sending an edit communication that edits the request because it is incorrect or in case the customer wants to change the request. The customer may edit a request by including the request identifier (e.g., "request identifier 1"), the keyword "edit" (or another like keyword), and a statement for the amended request. The communication system may compare the original request and the edited request to determine the changes to the request before proceeding with the requested action.

In other embodiments the customer may deactivate a request or otherwise end the request by sending an end communication that includes the keywords end, deactivate, or other like keyword with a specific reference to the request identifier, or by simply by responding to the original request communication through the same communication channel (e.g., replying to the same e-mail string).

In addition to using the present invention in the embodiments described above, embodiments of the present invention my have support for wider accessibility and use by various users (e.g., associates, customers, or the like). For example, users may be seeing impaired and as such may be able to utilize the voice commands over a phone or through other communication channels (e.g., Internet, or the like) to create actions in various applications (e.g., systems of record, accounts, or other applications).

The present invention may also provide additional benefits for preventing physiological conditions for users. For example, for users that are required to populate data into application, such as the associates discussed above that populate requests within systems of record, the present invention may prevent medical conditions (e.g., carpel-tunnel, strained eyes, tendonitis, or the like) that may occur from repetitive tasks, like typing information into an interface (e.g., data transfer requests, stock purchase orders, repetitive purchases, or the like).

Additional applications for the present invention include applications for hearing impaired users, which may be able to use the present invention to send written messages (e.g., via e-mail, text, or other written communication) to take actions within applications. For example, customers that are hearing impaired may be able to take a number of actions remotely (e.g., notification foreign travel, multiple transaction through multiple accounts, or the like) without having to call a customer service representative within the institution, or access applications directly to make the requested actions.

The present invention may also be utilized to support users that rely on multiple languages (e.g., primary language and secondary languages) which may or may not be supported by an application. For example, a user may be required to fill out a request to take an action with respect to an application (e.g., fill out a request in a system of record, transfer money from an account to another account, or the like) and the application uses language that the user may not be able to read or the user may only partially understand. The user may be able to take the action using a request over a communication channel in a first language in order to take an action with respect to an application that is in a second language. The present invention receives the requested action in the first language, translates the first language to a second language, takes the requested action (or takes the requested action in the first language directly by translating the second language in the interface into the first language), and responds to the user for additional information in the first language, if necessary. Moreover, in some embodiments, the user may request an action using a combination of one or more languages. The present invention identifies the requested action made by the user in the multiple languages and takes the actions as requested. The present invention may also respond to the user in both languages to make sure the user can provide additional information and/or understand and confirm the action requested by the user.

Moreover, the present invention may have stored pre-set parameters to take various actions with respect to various applications. For example, the present invention may store information for pre-set requests using abbreviations, keywords, or other identifiers (e.g., request 1, request X, data 1, entity 1, or the like) that may be created by an administrator or by a user for a particular application. For example, a pre-set identifier may be sent by a user, such as "take request 1" over a communication channel (e.g., written communication, voice communication, or the like). The use of the identifier "request 1" may be associated with an action that has multiple steps or that may be associated with an action that the user takes often. As such, a complex action (e.g., an action that requires a user to fill out an interface, takes multiple steps across multiple applications and/or accounts, or other like action that takes time and is repeatable) may be saved and stored under an identifier that a user may utilized to take the action using a simple word, characters, symbols, images, phrase, or the like.

In some embodiments the present invention may be used for threat analysis of requested user actions. For example, with respect to associates discussed above, the actions requested by the associates (e.g., scheduling events within the institution for data transfer, or the like) may be scanned for keywords, or the like, that may be used by units within the institution that determine potential misappropriation of institution data (e.g., customer data, institution processes, or the like). Keywords for actions within the communications from the associate may be analyzed in order to determine if the actions requested by the associated may be flagged for further investigation. In another example, with respect to the customers discussed above, the actions requested by the customers (e.g., account transfers to unrecognized accounts, newly added accounts, or the like) may be scanned by units within the institution and flagged to determine potential misappropriation of the customer's accounts. As such, keywords from the communications sent by the customers are analyzed to determine if the actions requested by the users (e.g., a user that has obtained unauthorized access to the device, or the like) may be an unauthorized action. The units analyzing actions taken by users within the institution may pay particular attention to the requested actions of the present invention because they are made using traditional communication channels.

The present invention may also be used for device control, such that a user cannot execute actions if the user is using an unauthorized device (e.g., unregistered, registered to a different user, device that is not secure, or the like). For example, the user may only be able to take actions (e.g., all actions, specific actions determined by an administrator or user, or the like) if the user is using the user's mobile device that has been pre-registered for use with the present invention, actions, or applications. As such, as previously discussed the present invention may determine the device from which the user is communicating (e.g., phone number of the device, device identification number, IP protocol number associated with the device, device identifier included in the written communication or spoken over a voice communication, or the like). For example, if the user requests an action through an e-mail, a device identifier (e.g., serial number, an assigned number when the device is registered, or the like) is automatically included in the e-mail communication or associated with data (e.g., metadata, or the like) associated with the e-mail communication. Before, during, or after the action is determined, the present invention may determine if the device being used (e.g., along with the user) is approved and/or registered and/or allowed to take the requested action. Once the device and/or user is approved the requested action may be taken as previously discussed herein.

In addition to the other forms of authentication previously discussed, the present invention may utilize other forms of authentication, such as biometric (e.g., fingerprint, thumbprint, eye/retina scan, facial recognition, gesture recognition, or the like) or voice recognition or verification (e.g., voice inflection, tone, or the like). These types of authentication may be combined with the other types previously discussed to provide a duel or two factor 9 (or more) authentication to verify either user and/or the device being used in order to determine if the user is authorized to make the requested action.

In still other embodiments of the invention, the present invention may be useful for users that are minors (e.g., under 18). Minors, for example minor customers, may not know how to take specific actions regarding the minor's accounts, such as logging in, making transfers, taking more complex actions, or the like, and as such the present invention may be utilized to allow minors to take the desired actions using simple communications (e.g., voice communication, written communication, or the like) as previously discussed above. In some embodiments any actions requested by the minors may be sent to the guardian (e.g., parent, power of attorney, or other guardian) for approval before the action is taken. In other embodiments of the invention, in addition to minors, the invention may also be useful for other types of dependents (e.g., elderly, disabled, or the like) that may have difficulty using technology to access applications (e.g., online banking accounts, or the like). The present invention allows these dependents, or guardians acting on behalf of these guardians, to take actions using communications that are not directly affiliated with the applications (e.g., online banking accounts).

FIG. 4 illustrates a communication system 1, in accordance with an embodiment of the present invention. As illustrated in FIG. 4, the user computer systems 10 are operatively coupled, via a network 2 to the financial institution systems, communication analysis systems 20, or other financial institution systems 40. As discussed herein, in this way, the user computer systems 10 may be utilized by users 9 (as previously discussed users may be associates of an institution and/or customers of an institution) to provide communications (e.g., through voice calls, e-mail messages, text messages, or other written or voice communications) in order to complete actions (e.g., system of record requests with respect to associates, customer account requests with respect to customers, or like) without the need to directly log into or access other various application interfaces (e.g., system of record interfaces with respect to associates, online customer account interface, or the like). As previously noted the user 9 is able to make simple requests through traditional communication channels that are not otherwise able to communicate directly with applications to complete requested actions for the applications without having to directly access the applications. The present invention may be particularly helpful for users 9 that are remotely located and have no, or limited, ability to log into various applications or websites to take actions within applications. For example, to fill out requests on the small screens of mobile devices may be difficult, or to access the Internet using data plans, Wi-Fi, or the like in remote locations may be difficult and/or expensive. As such, the present invention provides a simple want to request actions without directly logging into various applications. FIG. 4 illustrates only one example of embodiments of a communication system 1, and it will be appreciated that in other embodiments one or more of the systems (e.g., computers, mobile devices, servers, or other like systems) may be combined into a single system or be made up of multiple systems.

The network 2 may be a global area network (GAN), such as the Internet, a wide area network (WAN), a local area network (LAN), or any other type of network or combination of networks. The network 2 may provide for wireline, wireless, or a combination of wireline and wireless communication between devices on the network 2.

As illustrated in FIG. 4, the user computer systems 10 generally comprise a communication device 12, a processing device 14, and a memory device 16. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 is operatively coupled to the communication device 12 and the memory device 16. The processing device 14 uses the communication device 12 to communicate with the network 2 and other devices on the network 2, such as, but not limited to, the financial institution systems 20, the communication analysis systems 30, or other financial institution systems 40. As such, the communication device 12 generally comprises a modem, server, or other device for communicating with other devices on the network 2, and a display, camera, keypad, mouse, keyboard, microphone, and/or speakers for communicating with one or more users 9. The user computer systems 10 may include, for example, a personal computer, a laptop, a mobile device (e.g., phone, smartphone, tablet, or personal display device ("PDA"), or the like) or other devices, or the like.

As further illustrated in FIG. 4, the user computer systems 10 comprise computer-readable instructions 18 stored in the memory device 16, which in one embodiment includes the computer-readable instructions 18 of a web browser or application 17. In some embodiments, the memory device 16 includes a datastore 19 for storing data related to the user computer systems 10, including but not limited to data created and/or used by the web browser or application 17. As discussed above the web browser or application 17 allows the users 9 to communicate with the financial institution applications 27 (e.g., system of record applications, account applications, or the like), the communication analysis application 37 (e.g., the application that determines keywords in voice or written communications for use in completing requests), or other applications provided by the financial institution or third-parties in order to allow users 9 to take actions without having to log into applications or manually create requests. In some embodiments a web browser is used to access websites, applications, or the like; however, in other embodiments a specific application (e.g., mobile application, computer application, or the like) is specifically configured to communicate with the other systems and applications within the communication system 1. In still other embodiments of the invention portions of other applications may be stored on the user computer systems 10, such as but not limited to the financial institution applications 27, the communication analysis application 37, or other applications.

As further illustrated in FIG. 4, financial institution systems 20 generally comprise a communication device 22, a processing device 24, and a memory device 26. The processing device 24 is operatively coupled to the communication device 22 and the memory device 26. The processing device 24 uses the communication device 22 to communicate with the network 2, and other devices on the network 2, such as, but not limited to, the user computer systems 10, communication analysis systems 30, or other financial institution systems 40. As such, the communication device 22 generally comprises a modem, server, or other device(s) for communicating with other devices on the network 2.

As illustrated in FIG. 4, the financial institution systems 20 comprise computer-readable program instructions 27 stored in the memory device 26, which in one embodiment includes the computer-readable instructions 28 of financial institution systems 27. In some embodiments, the memory device 26 includes a datastore 29 for storing data related to the financial institution systems 20, including but not limited to data created and/or used by the financial institution applications 27. The financial institution applications 27, as discussed above, may include system of record applications, which associates may utilize for any number of requests related to the daily processes and procedures that associates use within the financial institution. The financial institution applications 27, as discussed above, may also include account applications, which customers may utilize to enter into transactions, as previously discussed. These financial institution applications 27 may typically require the associates or customers to log into the applications or access the applications and fill in data related order to take actions with respect to these applications.

As further illustrated in FIG. 4, the communication analysis systems 30 generally comprise a communication device 32, a processing device 34, and a memory device 36. The processing device 34 is operatively coupled to the communication device 32 and the memory device 36. The processing device 34 uses the communication device 32 to communicate with the network 2, and other devices on the network 2, such as, but not limited to, the user computer systems 10, the financial institution systems 20, and the other financial institution systems 40. As such, the communication device 32 generally comprises a modem, server, or other devices for communicating with other devices on the network 2.

As illustrated in FIG. 4, the communication analysis systems 30 comprise computer-readable program instructions 38 stored in the memory device 36, which in one embodiment includes the computer-readable instructions 38 of a communication analysis application 37. In some embodiments, the memory device 36 includes a datastore 39 for storing data related to the communication analysis systems 30, including but not limited to data created and/or used by the communication analysis application 37. The communication analysis application 37 allows the user 9, in one embodiment, to send simple voice, written, or other like communications through various communication channels that allows associates and customers to take actions within applications through simple communication commands (e.g., submitting service requests, initiating transactions, or the like). Since the financial institution (or other institutions) control the applications used within the financial institution, there is no reason why users should have to log into various applications to create multiple requests across the various applications. As such, the present invention allows the users to create requests using simple communications through traditional communication channels, while the institution on the back end determines what applications need to be accesses and what actions need to be taken to complete the requested actions of the users.

The other financial institution systems 40 are operatively coupled to the user computer systems 10, the financial institution systems 20, or communication analysis systems 30, through the network 2. The other financial institution systems 40 have devices the same as or similar to the devices described for the user computer systems 10, financial institution systems, and/or communication analysis systems 30 (e.g., communication device, processing device, memory device with computer-readable instructions, datastore, or the like). Thus, the other financial institution systems 40 communicate with the user computer systems 10, financial institution systems 20, or communication analysis systems 30, in the same or similar way as previously described with respect to the user computer systems 10, financial institution systems 20, and/or the communication analysis systems 30. The other financial institution systems 40, in some embodiments, provide additional applications within the financial system that allows the user to complete requests simply using traditional communication channels (e.g., e-mail, text, telephone calls, communications through specified application, such as social media accounts, or the like).

It is understood that the systems and devices described herein illustrate one embodiment of the invention. It is further understood that one or more of the systems, devices, or the like can be combined or separated in other embodiments and still function in the same or similar way as the embodiments described herein.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

U.S. patent application Ser. No. 14/287,861 to Kurian, entitled "Associate Communication Analysis Tool," which is filed concurrently herewith, is hereby incorporated by reference in its entirety.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for receiving customer communications from customers to take actions with respect to customer accounts, the system comprising:
   one or more memory devices; and
   one or more processing devices operatively coupled to the one or more memory devices, wherein the one or more processing devices are configured to execute computer-readable program code to:
      receive a request communication with a requested action from a customer to perform an action associated with a customer account, wherein the requested action is transferring first funds from the customer account to a first entity, wherein the request communication is made using a typed electronic communication, and wherein the requested action is made without the customer logging into an online banking account to access the customer account;
      determine keywords within the request communication for the requested action, wherein the keywords for the requested action are determined by electronically scanning the typed electronic communication;
      determine the keywords within the request communication for the customer account, wherein the keywords for the customer account are determined by electronically scanning the typed electronic communication;
      determine a profile for the customer associated with the request communication, wherein the profile is determined by accessing a profile database;
      determine when the customer has authorization to take the requested action in the customer account based on the keywords and the profile;
      assign a request identifier to the request action, wherein the request identifier is utilized to link related communications;
      receive an edit communication to edit the requested action, wherein the edit communication references the request identifier;
      access the customer account without the customer accessing the customer's online baking account;
      take the action on the customer account based on the keywords within the request communication and the edit communication, wherein the transfer of the first funds from the customer account is completed without the customer logging into the online banking account to access the customer account; and
      receive additional communication from the customer to perform additional actions by cloning the requested action, wherein the additional communication includes a reference to the request identifier and second funds for a second entity.

2. The system of claim 1, wherein the one or more processing devices are further configured to execute the computer-readable program code to:
   determine if additional information is needed to take the action in the customer account;
   send a response communication to the customer, wherein the response communication comprises a request for the additional information needed to take the action in the customer account.

3. The system of claim 2, wherein the one or more processing devices are further configured to execute the computer-readable program code to:
   receive an additional communication from the customer with the additional information needed to complete the action in the customer account;
   determine the keywords within the additional communication from the associate; and
   complete the action in the customer account based on the keywords within the additional communication from the customer.

4. The system of claim 1, wherein the one or more processing devices are further configured to execute the computer-readable program code to:
   submit the requested action to a business unit or regulator for approval to perform the action.

5. The system of claim 1, wherein the one or more processing devices are further configured to execute the computer-readable program code to:
   send a summary communication to the customer requesting confirmation to take the action, wherein the summary communication includes details of the requested action; and
   receive a confirmation communication from the customer with the confirmation to take the action.

6. The system of claim 1, wherein the one or more processing devices are further configured to execute the computer-readable program code to:

identify an identity of the customer based on a customer identifier from a communication channel through which the customer sends the request communication; and wherein determining if the customer has the authorization to take the requested action comprises comparing the customer identifier with the profile for the customer.

7. The system of claim 1, wherein taking the requested action is further based on the profile of the customer.

8. The system of claim 1, wherein determining when the customer has authorization to take the requested action in the customer account comprises determining words, characters, or phrases, and the order of each of the words, the characters, or the phrases, which the customer has previously indicated must be included in the communication in order to provide authentication of the customer.

9. A computer program product for receiving customer communications from customers to take actions with respect to customer accounts, the computer program product comprising at least one non-transitory computer-readable medium having computer-readable program code portions embodied therein, the computer-readable program code portions comprising:

an executable portion configured to receive a request communication with a requested action from a customer to perform an action associated with a customer account, wherein the requested action is transferring first funds from the customer account to a first entity, wherein the request communication is made using a typed electronic communication, and wherein the requested action is made without the customer logging into an online banking account to access the customer account;

an executable portion configured to determine keywords within the request communication for the requested action, wherein the keywords for the requested action are determined by electronically scanning the typed electronic communication;

an executable portion configured to determine the keywords within the request communication for the customer account, wherein the keywords for the customer account are determined by electronically scanning the typed electronic communication;

an executable portion configured to determine a profile for the customer associated with the request communication, wherein the profile is determined by accessing a profile database;

an executable portion configured to determine when the customer has authorization to take the requested action in the customer account based on the keywords and the profile;

an executable portion configured to assign a request identifier to the request action, wherein the request identifier is utilized to link related communications;

an executable portion configured to receive an edit communication to edit the requested action, wherein the edit communication references the request identifier;

an executable portion configured to access the customer account without the customer accessing the customer's online baking account;

an executable portion configured to take the action on the customer account based on the keywords within the request communication and the edit communication, wherein the transfer of the first funds from the customer account is completed without the customer logging into the online banking account to access the customer account; and an executable portion configured to receive additional communication from the customer to perform additional actions by cloning the requested action, wherein the additional communication includes a reference to the request identifier and second funds for a second entity.

10. The computer program product of claim 9, wherein the computer-readable program code portions comprise:

an executable portion configured to determine if additional information is needed to take the action in the customer account;

an executable portion configured to send a response communication to the customer, wherein the response communication comprises a request for the additional information needed to take the action in the customer account.

11. The computer program product of claim 10, wherein the computer-readable program code portions comprise:

an executable portion configured to receive an additional communication from the customer with the additional information needed to complete the action in the customer account;

an executable portion configured to determine the keywords within the additional communication from the associate; and an executable portion configured to complete the action in the customer account based on the keywords within the additional communication from the customer.

12. The computer program product of claim 9, wherein the computer-readable program code portions comprise:

an executable portion configured to submit the requested action to a business unit or regulator for approval to perform the action.

13. The computer program product of claim 9, wherein the computer-readable program code portions comprise:

an executable portion configured to send a summary communication to the customer requesting confirmation to take the action, wherein the summary communication includes details of the requested action; and an executable portion configured to receive a confirmation communication from the customer with the confirmation to take the action.

14. The computer program product of claim 9, wherein the computer-readable program code portions comprise:

an executable portion configured to identify an identity of the customer based on a customer identifier from a communication channel through which the customer sends the request communication;

wherein the executable portion configured to determine if the customer has the authorization to take the requested action comprises comparing the customer identifier with the profile for the customer; and wherein the executable portion configured to take the requested action is further based on the profile of the customer.

15. The computer program product of claim 9, wherein determining when the customer has authorization to take the requested action in the customer account comprises determining words, characters, or phrases, and the order of each of the words, the characters, or the phrases, which the customer has previously indicated must be included in the communication in order to provide authentication of the customer.

16. A method for receiving customer communications from customers to take actions with respect to customer accounts, the method comprising:

receiving, by one or more processing devices, a request communication with a requested action from a customer to perform an action associated with a customer account, wherein the requested action is transferring first funds from the customer account to a first entity, wherein the request communication is made using a typed electronic communication, and wherein the requested action is made without the customer logging into an online banking account to access the customer account;

determining, by the one or more processing devices, keywords within the request communication for the requested action, wherein the keywords for the requested action are determined by electronically scanning the typed electronic communication;

determining, by the one or more processing devices, the keywords within the request communication for the customer account, wherein the keywords for the customer account are determined by electronically scanning the typed electronic communication;

determining, by the one or more processing devices, a profile for the customer associated with the request communication, wherein the profile is determined by accessing a profile database;

determining, by the one or more processing devices, when the customer has authorization to take the requested action in the customer account based on the keywords and the profile;

assigning, by the one or more processing devices, a request identifier to the request action, wherein the request identifier is utilized to link related communications;

receiving, by the one or more processing devices, the an edit communication to edit the requested action, wherein the edit communication references the request identifier;

accessing, by the one or more processing devices, the customer account without the customer accessing the customer's online baking account;

taking, by the one or more processing devices, the action on the customer account based on the keywords within the request communication, wherein the transfer of the first funds from the customer account is completed without the customer logging into the online banking account to access the customer account; and receiving, by the one or more processing devices, additional communication from the customer to perform additional actions by cloning the requested action, wherein the additional communication includes a reference to the request identifier and second funds for a second entity.

* * * * *